US012081895B2

(12) United States Patent
Chapman et al.

(10) Patent No.: US 12,081,895 B2
(45) Date of Patent: Sep. 3, 2024

(54) SYSTEMS AND METHODS FOR REAL-TIME COMPOSITING OF VIDEO CONTENT

(71) Applicant: DISNEY ENTERPRISES, INC., Burbank, CA (US)

(72) Inventors: Steven M. Chapman, Burbank, CA (US); Mehul Patel, Burbank, CA (US); Joseph Popp, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 17/688,289

(22) Filed: Mar. 7, 2022

(65) Prior Publication Data
US 2022/0191349 A1 Jun. 16, 2022

Related U.S. Application Data

(63) Continuation of application No. 15/970,783, filed on May 3, 2018, now Pat. No. 11,272,081.

(51) Int. Cl.
H04N 5/222 (2006.01)
G06T 7/70 (2017.01)
G06T 11/60 (2006.01)
H04N 5/272 (2006.01)

(52) U.S. Cl.
CPC .......... *H04N 5/2228* (2013.01); *G06T 11/60* (2013.01); *H04N 5/272* (2013.01); *G06T 7/70* (2017.01); *G06T 2200/24* (2013.01); *G06T 2207/30244* (2013.01)

(58) Field of Classification Search
None
See application file for complete search history.

(56) References Cited

U.S. PATENT DOCUMENTS

| 10,777,010 B1* | 9/2020 | Patel ................. G06T 15/50 |
| 2008/0071559 A1 | 3/2008 | Arrasvuori |
| 2012/0019513 A1* | 1/2012 | Fong ................. G06T 17/05 345/419 |

(Continued)

OTHER PUBLICATIONS

Masanao Koeda et al., "Annotation-Based Assistance System for Unmanned Helicopter with Wearable Augmented Reality Environment", Proceedings of the Third IEEE and ACM International Symposium on Mixed and Augmented Reality (ISMAR 2004), 2 pages.

*Primary Examiner* — Kyle Zhai
(74) *Attorney, Agent, or Firm* — Dorsey & Whitney LLP

(57) ABSTRACT

Systems and methods for compositing real-world video with a virtual object are disclosed. In one embodiment the system includes a processor; and a computer-readable non-transitory storage medium, the medium encoded with instructions that when executed cause the processor to perform operations including receiving video of a video capture region from a camera coupled to an unmanned vehicle; obtaining a map representation of the video capture region; placing the virtual object into the map representation; rendering the video with the virtual object to generate a rendered video; displaying the rendered video; and based on an elevation of the unmanned vehicle, updating the virtual object to transition between a top view of the virtual object and an elevation view or perspective view of the virtual object.

20 Claims, 8 Drawing Sheets

(56) References Cited

U.S. PATENT DOCUMENTS

| | | | |
|---|---|---|---|
| 2013/0135344 A1* | 5/2013 | Stirbu | G06F 16/972 |
| | | | 345/629 |
| 2013/0314398 A1 | 11/2013 | Coates et al. | |
| 2014/0036090 A1 | 2/2014 | Black et al. | |
| 2014/0267282 A1* | 9/2014 | Ren | G01C 21/367 |
| | | | 345/428 |
| 2014/0267723 A1 | 9/2014 | Davidson, Jr. et al. | |
| 2016/0187490 A1 | 6/2016 | Anghelescu et al. | |
| 2016/0368602 A1* | 12/2016 | Zhang | H04N 5/2628 |
| 2017/0076499 A1 | 3/2017 | Jiang et al. | |
| 2018/0003510 A1 | 1/2018 | Wegelin et al. | |
| 2018/0060658 A1* | 3/2018 | Schultz | H04N 21/4316 |
| 2018/0356967 A1 | 12/2018 | Rasheed | |

\* cited by examiner

SYSTEMS AND METHODS FOR REAL-TIME COMPOSITING OF VIDEO CONTENT

CROSS REFERENCE TO RELATED APPLICATIONS

This application claims the benefit of priority pursuant to 35 U.S.C. § 120 of U.S. patent application Ser. No. 15/970,783, filed 3 May 2018, U.S. Pat. No. 11,272,081 entitled "Systems and Methods for Real-Time Compositing of Video Content," which is hereby incorporated by reference herein in its entirety.

BACKGROUND

Scouting film locations may require photographers or videographers to capture a given environment without much input from a filmmaker. For example, the location may be remote, or the filmmaker may not have seen a scout's suggested location yet. The photos and videos may be captured and processed without considering the context for a scene in a movie, wasting time and money to scout the given environment.

SUMMARY

A system for compositing real-world video with a virtual object is disclosed. In one embodiment the system includes a processor; and a computer-readable non-transitory storage medium, the medium encoded with instructions that when executed cause the processor to perform operations including receiving video of a video capture region from a camera coupled to an unmanned vehicle; obtaining a map representation of the video capture region; displaying the map representation on a graphical user interface; placing the virtual object into the map representation; rendering the video with the virtual object to generate a rendered video; displaying the rendered video; and based on an elevation of the unmanned vehicle, updating the virtual object to transition between a top view of the virtual object and an elevation view or perspective view of the virtual object.

Optionally in some embodiments, the virtual object is placed into the map representation at a virtual location that corresponds to a real-world location.

Optionally in some embodiments, the non-transitory computer-readable medium stores instructions that, when executed, cause the processor to generate object data based on the real-world location.

Optionally in some embodiments, the object data includes an indication that the real-world location is viewable in the video.

Optionally in some embodiments, the non-transitory computer-readable medium stores instructions that, when executed, cause the processor to render the virtual object in the rendered video based on the indication.

Optionally in some embodiments, the non-transitory computer-readable medium stores instructions that, when executed, cause the processor to receive location information based on a location of the unmanned vehicle.

Optionally in some embodiments, the map representation is based on the location information.

Optionally in some embodiments, the non-transitory computer-readable medium stores instructions that, when executed, cause the processor to receive camera information based on at least one of an orientation or an angle of the camera.

Optionally in some embodiments, the non-transitory computer-readable medium stores instructions that, when executed, cause the processor to determine whether the real-world location is within the video capture region based on at least one of the location information, the camera information, or the object data.

Optionally in some embodiments, the virtual object comprises a pre-designed asset.

Optionally in some embodiments, the rendered video is displayed in the graphical user interface.

Optionally in some embodiments, the system include a head-mounted display. The rendered video is displayed by the head-mounted display.

Optionally, in some embodiments a method for compositing real-time, real-world video with a virtual object, is disclosed. In one embodiment, the method includes receiving video of a video capture region from a camera coupled to an unmanned vehicle; obtaining a map representation of the video capture region; displaying the map representation on a graphical user interface; placing the virtual object into the map representation; rendering the video with the virtual object to generate a rendered video; displaying the rendered video; and based on an elevation of the unmanned vehicle, updating the virtual object to transition between a top view of the virtual object and an elevation view or perspective view of the virtual object.

A system for compositing real-world video with a virtual object is disclosed. In one embodiment the system includes an unmanned vehicle; a processor configured to: receive video of a video capture region from a camera coupled to the unmanned vehicle; obtain a map representation of the video capture region; display the map representation on a graphical user interface; place the virtual object into the map representation; render the video with the virtual object to generate a rendered video; display the rendered video; and based on an elevation of the unmanned vehicle, update the virtual object to transition between a top view of the virtual object and an elevation view or perspective view of the virtual object.

BRIEF DESCRIPTION OF THE DRAWINGS

Further aspects of the present disclosure will be more readily appreciated upon review of the detailed description of the various disclosed embodiments, described below, when taken in conjunction with the accompanying figures.

DETAILED DESCRIPTION

The figures are described in greater detail in the description and examples below, are provided for purposes of illustration only, and merely depict typical or example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

DETAILED DESCRIPTION

Scouts may collect sparse reference shots without immediate concern for a film's planned visualizations, visuals, and practical effects. The present disclosure helps bridge the spatial and temporal disconnection between pre-production location requirements ("scouting") and pre-visualization concept designs and artwork planned for filming ("pre-viz".)

Embodiments of the present disclosure are directed to systems, methods, and devices, for compositing real-time, real-world video with virtual objects. In various deployments described herein, virtual objects may be added to a representation of a location of interest. Data may be generated about the location of the virtual object corresponding to a real-world position, based on the virtual object's location in the representation. The virtual objects may be rendered and incorporated into a rendered video. Depending on whether a camera of an unmanned vehicle is capturing a video of a region corresponding to the virtual object's real-world position, rendered virtual objects may be displayed in the rendered video.

Figure 1:
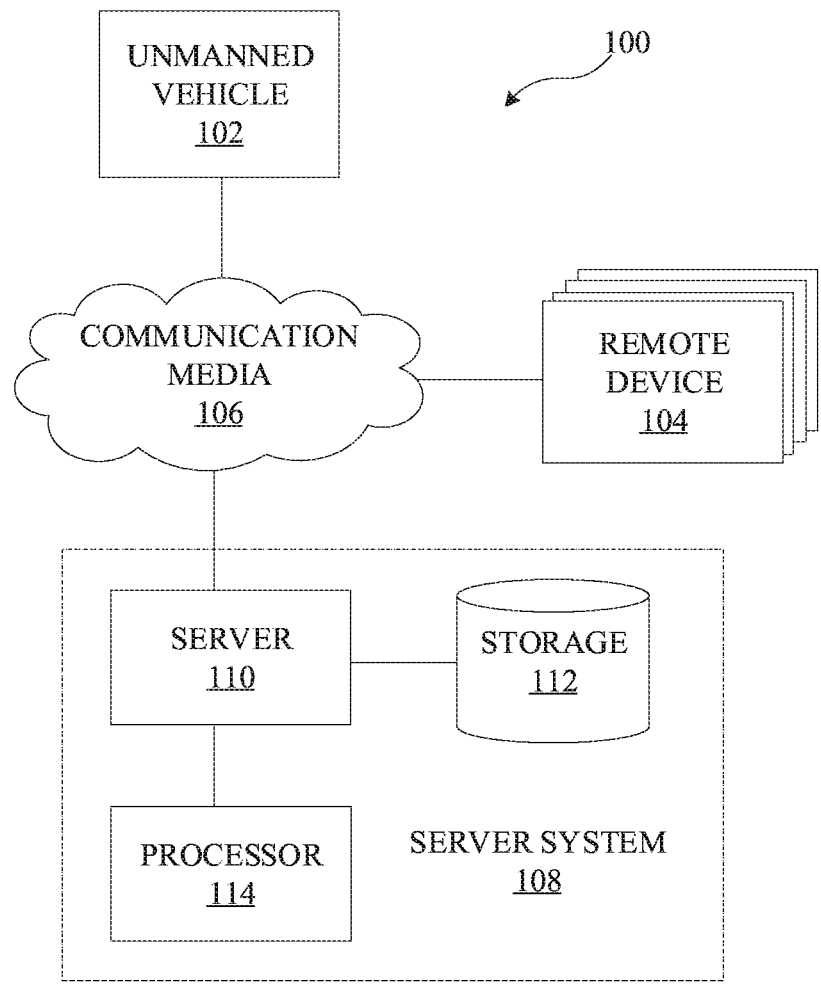
FIG. 1 illustrates an example environment in which embodiments of the disclosure may be implemented.

FIG. 1 depicts example environment 100, which may be used in connection with implementing embodiments of the disclosed systems, methods, and devices. By way of example, the various below-described components of FIG. 1 may be used to composite real-time, real-world video with virtual objects. The video may be captured by unmanned vehicle 102 at the location of interest via a camera. Unmanned vehicle 102 may send location information corresponding to the location of unmanned vehicle 102 to server system 108. Unmanned vehicle 102 may also send camera information that may indicate how the camera is oriented and capturing images and/or videos to server system 108. A representation of a location of interest may be displayed on a graphical user interface (not shown) of server system 108. The location of interest may include the position of unmanned vehicle 102. A suite of virtual objects may be provided in the graphical user interface that can be used in the representation of the location of interest. Virtual objects may be previously constructed story planning visualization models. Virtual objects placed in the representation and the video may be rendered by an engine that overlays the rendered virtual objects in the rendered video. The rendered video with the rendered virtual objects may be sent to a remote device. The rendered video may be displayed on a graphical user interface of the remote device.

In embodiments, unmanned vehicle 102 may be a drone or another unmanned aerial vehicle. Unmanned vehicle 102 may include a camera to capture images and/or video and a global positioning system (GPS) receiver. Unmanned vehicle 102 may include location information, camera information (e.g., intrinsic camera information and extrinsic camera information), and/or other information.

In embodiments, location information may reflect the real-world location of unmanned vehicle 102. The location information may be determined using GPS, cell towers, Bluetooth® and/or other technology. The location information may be used in generating a representation of the location of interest. The location of interest may be geographically remote from a server system 108 or remote device 104 or relatively close to the server system 108 or remote device 104.

In embodiments, camera information may indicate the angle that the camera is facing, with respect to the horizon, the direction the camera is facing, the camera orientation, the shutter speed, the field of view, the f stop, the film speed, the focal length, aperture, etc. Location information and camera information may be used to determine whether a virtual object will appropriately integrate with a suggested physical shooting location in a final live film when combined with computer-generated visual effects elements, or otherwise presented in a given frame of the rendered video.

In embodiments, the representation of the location of interest may be a map of the location of interest, or otherwise correspond to the location of interest. The map may be determined based on the location information of unmanned vehicle 102. The map may include topography, terrain, landmarks, natural features, and/or other information corresponding to the location of interest. The map may be a satellite image of the location of interest. The map may be displayed on a graphical user interface of the server system 108. The map may have a video capture region indicating a portion of the location of interest that the camera is currently capturing on video. The video capture region may use the location information and camera information to determine a given video capture region. The video capture region may dynamically change based on the movement of unmanned vehicle 102 around the location of interest.

In embodiments, the graphical user interface may include a suite of interactable virtual objects. A user may interact with the suite of virtual objects by selecting one of the virtual objects and placing them into the representation. Placing a virtual object into the representation generates data about the location of the virtual object in the representation corresponding to a real-world position. Virtual objects may be copied, removed, moved, replaced, and/or other function by interacting with the graphical user interface of server system 108, which may affect the corresponding data. The virtual objects may be placed into the representation before or while unmanned vehicle 102 captures video.

In embodiments, the virtual objects may include generic shapes, such as rectangles, squares, triangles and/or other shapes, generic elements for films, such as characters, vehicles, houses, trees, bridges, and/or other elements. The virtual objects may include specific elements for a given film, such as a dragon, a dungeon, a goblin, a main character, a weapon, a structure, and/or other elements. The virtual objects may be made before or while unmanned vehicle 102 captures video.

In embodiments, the virtual objects and the video may be rendered through a graphics engine, such as Unity, HTML5, Godot, Source, Open GL, Havok, Unreal, Unigine, and/or other graphics engines. One of skill in the art will appreciate that other technology may be used to render the virtual objects. The rendered virtual objects may be overlaid on the real-time, real-world video captured by unmanned vehicle 102 via the camera to generate a rendered video. The rendered virtual objects may be two dimensional or three dimensional in the video. For example, a virtual object of a person may be depicted in the representation as a circle. The user may place the person into the representation, generating position data of a real-world position. When the camera of unmanned vehicle 102 captures video of the real world position, the rendered virtual object may appear to be a circle from a top view in the rendered video. If unmanned vehicle 102 moves closer to the ground in the location of interest, such that the camera views the rendered virtual object of the person from a side view, the rendered virtual object of the person in the real-world rendered video may appear to be cylindrical.

In embodiments, the rendered video may include the real-time, real-world video and rendered virtual objects. In other embodiments, the video may not need to be rendered because there are no rendered virtual objects in a current frame. Server system 108 rendering the video and virtual objects may use the location information, the camera information, and the virtual object data to determine whether virtual objects are within a given frame of the rendered video. The location information and camera information from unmanned vehicle 102 may be used to determine what region that the camera of unmanned vehicle 102 is capturing. The virtual object data may be used to determine whether the camera of unmanned vehicle 102 is capturing a region in which the virtual object is positioned. Based on the location information, the camera information, and the virtual object data, server system 108 may or may not render the video to include the virtual objects.

As shown in FIG. 1, environment 100 may include one or more of unmanned vehicle 102, remote device 104, and server system 108. Unmanned vehicle 102 can be coupled to remote device 104 and/or server system 108 via communication media 106. As will be described in detail herein, unmanned vehicle 102, remote device 104, and/or server system 108 may exchange communications signals, including location information, camera information, virtual object data, and/or other information via communication media 106.

Unmanned vehicle 102 may include a variety of vehicles, such as drones, ground vehicles, other aerial vehicles, or other unmanned vehicles. Unmanned vehicle 102 may include a remote controller to pilot unmanned vehicle 102, as will be described in further detail in FIG. 2. The remote controller may have a graphical user interface that may perform such functions as accepting user input and displaying video, virtual objects, or other content. The graphical user interface may be provided by various operating systems known in the art, such as, for example, iOS, Android, Windows Mobile, Windows, Mac OS, Chrome OS, Linux, Unix, a gaming platform OS (e.g., Xbox, PlayStation, Wii), etc.

Remote device 104 may include a variety of electronic computing devices, such as, for example, a smartphone, tablet, laptop, computer, wearable device, television, remote controller, etc. In embodiments, remote device 104 includes components that may be used to display video, rendered video, images, and/or other audio/visual information, such as a television, a monitor, a laptop, a computer, wearable device, tablet, smartphone, etc. In various embodiments, communication media 106 may be based on one or more wireless communication protocols such as Wi-Fi, Bluetooth®, ZigBee, 802.11 protocols, Infrared (IR), Radio Frequency (RF), 2G, 3G, 4G, 5G, etc., and/or wired protocols and media. Communication media 106 may be implemented as a single medium in some cases.

As mentioned, remote device 104 may take a variety of forms, such as a desktop or laptop computer, a smartphone, a tablet, a smartwatch or other wearable electronic device, a television or other audio or visual entertainment device or system, a graphical user interface on a remote controller, a camera (including still shot or video), or the like. Unmanned vehicle 102 and remote device 104 may communicate with other devices and/or with one another over communication media 106 with or without the use of server system 108. In various embodiments, unmanned vehicle 102, remote device 104, and/or server system 108 may be used to perform various processes described herein and/or may be used to execute various operations described herein with regards to one or more disclosed systems and methods. Upon studying the present disclosure, one of skill in the art will appreciate that environment 100 may include multiple unmanned vehicles 102, remote devices 104, communication media 106, server systems 108, servers 110, processors 114, and/or storage 112.

As mentioned, communication media 106 may be used to connect or communicatively couple unmanned vehicle 102, remote device 104, and/or server system 108 to one another or to a network, and communication media 106 may be implemented in a variety of forms. For example, communication media 106 may include an Internet connection, such as a local area network (LAN), a wide area network (WAN), a fiber optic network, internet over power lines, a hard-wired connection (e.g., a bus), and the like, or any other kind of network connection. Communication media 106 may be implemented using any combination of routers, cables, modems, switches, fiber optics, wires, radio (e.g., microwave/RF links), and the like. Upon reading the present disclosure, one of skill in the art will recognize other ways to implement communication media 106 for communications purposes.

Likewise, though not shown, it will be appreciated that a similar communication medium may be used to connect or communicatively couple server 110, storage 112, and/or processor 114 to one another in addition to other elements of environment 100. In example implementations, communication media 106 may be or include a wired or wireless wide area network (e.g., cellular, fiber, and/or circuit-switched connection, etc.) for unmanned vehicle 102, remote device 104, and/or server system 108, which may be relatively geographically disparate; and in some cases, aspects of communication media 106 may involve a wired or wireless local area network (e.g., Wi-Fi, Bluetooth, unlicensed wireless connection, USB, HDMI, standard AV, etc.), which may be used to communicatively couple aspects of environment 100 that may be relatively close geographically.

Server system 108 may provide, receive, collect, or monitor information to/from unmanned vehicle 102 and/or remote device 104, such as, for example, virtual objects, virtual object data, representations, location information, camera information, video, security and encryption information, and the like. Server system 108 may be configured to receive or send such information via communication media 106. This information may be stored in storage 112 and may be processed using processor 114. For example, processor 114 may include an analytics engine capable of performing analytics on information that server system 108 has collected, received, etc. from unmanned vehicle 102 and/or remote device 106. Processor 114 may include a game engine capable of rendering virtual objects and the video that server system 108 has collected, received, etc. from unmanned vehicle 102. The game engine may be used to generate a rendered video including rendered virtual objects. In embodiments, server 110, storage 112, and processor 114 may be implemented as a distributed computing network, a relational database, or the like.

Server 110 may include, for example, an Internet server, a router, a desktop or laptop computer, a smartphone, a tablet, a processor, a module, or the like, and may be implemented in various forms, including, for example, an integrated circuit or collection thereof, a printed circuit board or collection thereof, or in a discrete housing/package/rack or multiple of the same. In embodiments, server 110 directs communications between unmanned vehicle 102 and remote device 104 over communication media 106. For example, server 110 may process and exchange messages between unmanned vehicle 102 and remote device 104 that relate to virtual objects, representations of the location of interest, video, cameras, etc. Server 110 may update information stored on unmanned vehicle 102 and/or remote device 104. Server 110 may send/receive information to/from unmanned vehicle 102 and/or remote device 104 in real-time or sporadically. Further, server 110 may implement cloud computing capabilities for unmanned vehicle 102 and/or remote device 104.

Figure 2:
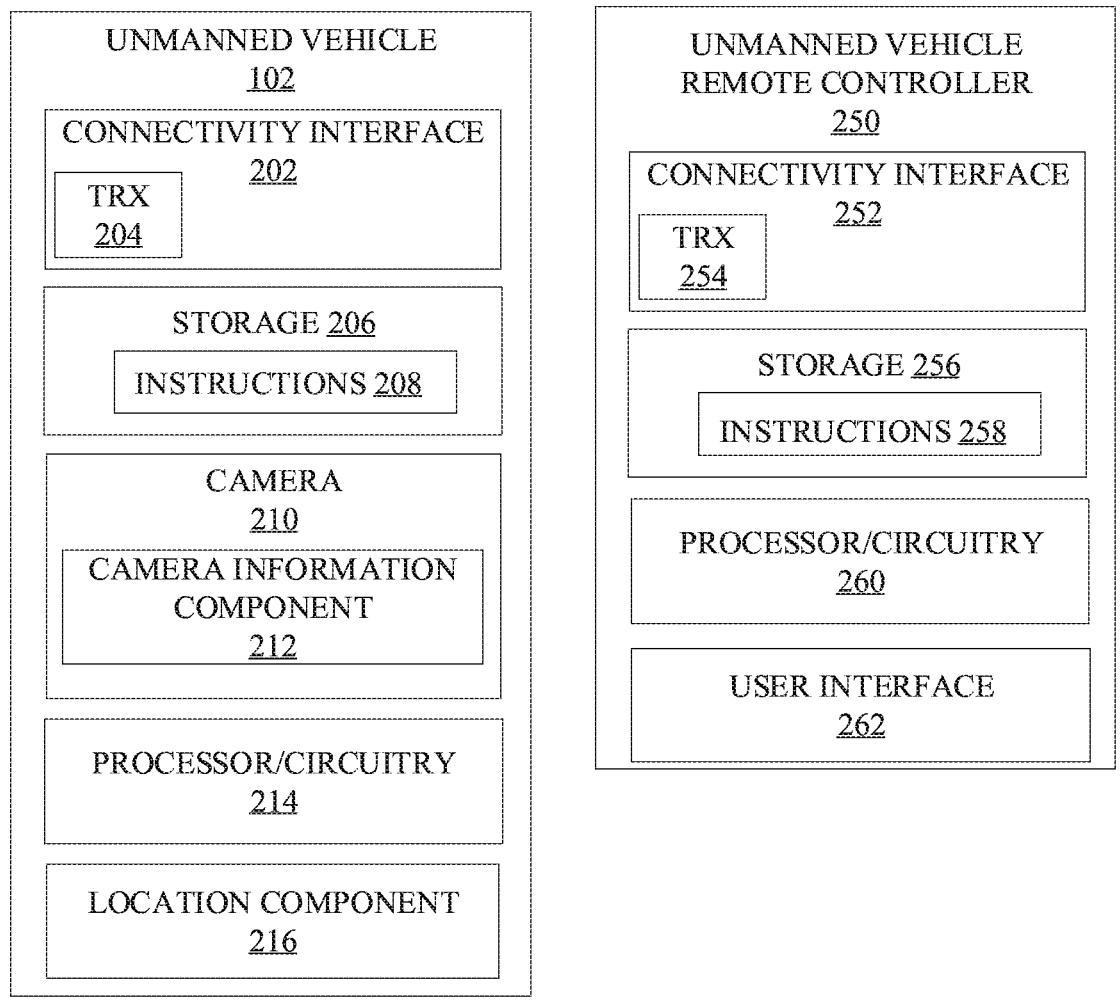
FIG. 2 illustrates an example unmanned vehicle and a corresponding example unmanned vehicle remote controller in accordance with embodiments of the disclosure.

FIG. 2 depicts example unmanned vehicle 102 and a corresponding unmanned vehicle remote controller 250, which includes examples of additional aspects of the present disclosure that may be implemented in connection with example environment 100. As illustrated, unmanned vehicle 102 may include connectivity interface 202, which may further include transceiver 204 to communicatively couple unmanned vehicle 102 to, for example, remote device 104, server system 108, and/or unmanned vehicle remote controller 250 via communication media 106. In the illustrated embodiment, unmanned vehicle 102 further includes storage 206 (which in turn may store instructions 208), camera 210, camera information component 212 (which may be used to provide the orientation of camera 210, the field of view, the f stop, the film speed, the focal length, aperture, etc.), processor/circuitry 214, and location component 216. A bus (not shown in FIG. 2) may be used to interconnect the various elements of unmanned vehicle 102 and transfer data between these elements.

In some embodiments, unmanned vehicle remote controller 250 may include a graphical user interface displaying live captured video by unmanned vehicle 102. The graphical user interface may provide a representation of the location of interest and interaction with a suite of virtual objects, such as provided in server system 108, which is described in greater detail herein. In embodiments, unmanned vehicle remote controller 250 may be separate from server system 108, which provides the representation of the location of interest and interaction with the suite of virtual objects. Both unmanned vehicle remote controller 250 and server system 108 may be separate from remote device 104 on which the rendered virtual objects and video may be displayed.

Connectivity interface 202 may interface unmanned vehicle 102 to communication media 106, such that unmanned vehicle 102 may be communicatively coupled to remote device 104, and/or server system 108 via communication media 106. Transceiver 204 of connectivity interface 202 may include multiple transceivers operable on different wireless standards. Transceiver 204 may be used to send/receive virtual objects, location information, camera information, virtual object data, video, security and encryption information to/from remote device 104 and/or server system 108. Additionally, connectivity interface 202 may include additional components for controlling radio and/or wired connections, such as baseband and/or Ethernet modems, audio/video codecs, and so on.

Connectivity interface 202 may interface unmanned vehicle 102 to unmanned vehicle remote controller 250 via connectivity interface 252. Connectivity interface 252 and transceiver 254 may operate substantially the same as connectivity interface 202 and transceiver 204. Unmanned vehicle remote controller 250 may be a remote device 104 (referencing FIG. 1 by way of example).

In embodiments, transceivers 204 and 254 may utilize Bluetooth, ZIGBEE, Wi-Fi, GPS, cellular technology, or some combination thereof. Further, although FIG. 2 illustrates a single transceiver 204 in unmanned vehicle 102 and a single transceiver 254 in unmanned vehicle remote controller 250 for transmitting/receiving information, separate transceivers may be dedicated for communicating particular types of data or for doing so in particular fashions. In some cases, transceivers 204 and 254 may include a low energy transmitter/receiver such as a near field communications (NFC) transmitter/receiver or a Bluetooth Low Energy (BLE) transmitter/receiver. In further example implementations, separate wireless transceivers may be provided for receiving/transmitting high fidelity audio and/or video data. In yet additional embodiments, a wired interface (e.g., micro-USB, HDMI, etc.) may be used for communicating data between unmanned vehicle 102 and remote device 104, server system 108, and/or unmanned vehicle remote controller 250.

Storage 206 and 256 may include volatile memory (e.g., RAM) and/or non-volatile memory (e.g., flash storage), may include any of EPROM, EEPROM, cache, or may include some combination/variation thereof. In various embodiments, storage 206 and 256 may store video data, camera information, location information and/or other data collected by unmanned vehicle 102 (e.g., security and encryption information, etc.). Storage 206 and 256 may also be used to store downloaded content (e.g., videos, photos, virtual objects, and so on) for later retrieval and use, e.g., in connection with compositing real-time, real-world video with virtual objects. Additionally, storage 206 and 256 may store instructions 208 and 258, respectively, that, when executed using processors/circuitry 214 and 260, for example, can cause unmanned vehicle 102 and unmanned vehicle remote controller 250 to perform various operations that will be described in further detail herein.

In various embodiments, a pilot may interact with unmanned vehicle 102 using unmanned vehicle remote controller 250 via user interface 262, which may include a display (not shown) for displaying video, location information, virtual objects, etc. to the pilot. Instructions 208 and 258 may be used for processing and/or displaying rendered virtual objects using unmanned vehicle remote controller 250, according to various operations described herein.

Instructions 208 and 258 may be downloaded, installed, and/or initially configured/setup on unmanned vehicle 102 and unmanned vehicle remote controller 152. For example, unmanned vehicle 102 may obtain instructions 208 from server system 108, or from another source accessed via communication media 106, such as an application store or the like. In another example, unmanned vehicle remote controller 250 may obtain instructions 258 from server system 108, or from another source accessed via communication media 106, such as an application store or the like. Following installation and setup, instructions 208 and 258 may be used to access virtual objects, location information, virtual object data, camera information, video, security and encryption information, and/or other information, as will be described herein. Instructions 208 and 258 may also be used to interface with other electronic devices, for example, to receive virtual objects, virtual object data, representations, location information, camera information, video, security and encryption information from unmanned vehicle 102, unmanned vehicle remote controller 250, remote device 104, and/or server system 108, and/or content stored at server system 108, etc., as will be described herein.

Instructions 208 and 258 may include various code/functional modules involving, for example, virtual objects, virtual object data, representations, location information, camera information, video, security and encryption information, etc. These modules may be implemented separately or in combination. Each module may include computer-readable media and have computer-executable code stored thereon, such that the code may be operatively coupled to and/or executed by processors/circuitry 214 and 260 to perform specific functions (e.g., as described herein with regard to various operations and flow diagrams, etc.) with respect to compositing real-time, real-world video with virtual objects and tasks related thereto. Instructions 208 and 258 may include a native application modified with a software design kit (e.g., depending on the operating system) in order to carry out the functionalities/features described herein.

Unmanned vehicle 102 may include camera 210 (or cameras 210). In embodiments, camera 210 may be integrated into and/or implemented in connection with instructions 208 and 258. Camera 210 may enable unmanned vehicle 102 to be capable of displaying a real-time view of a physical, real-world environment. When a user looks at remote device 104, camera 210 may be used, in part, to enable a viewer to see a rendered video of the physical real-world environment with rendered virtual objects. Camera 210 may include one or more cameras for capturing the real-world scene, which may then be displayed to the pilot through unmanned vehicle remote controller 250 via user interface 262 (e.g., display thereof) and/or to the viewer through remote device 104. As used herein, a visual scene may refer to a view(s) of the real-world environment. For instance, a visual scene may be a series of images, or video, of a real-world environment.

Camera 210 may include camera information component 212. In embodiments, camera information component 212 may be integrated into and/or implemented in connection with instructions 208 and 258. Camera information component 212 may control an orientation of camera 210 or otherwise control the movement and/or operation of camera 210. Camera information component 212 may describe an orientation of camera 210 of unmanned vehicle 102. For example, camera information component 212 may provide the angle of the camera with respect to the horizon to remote device 104 and/or server system 108. In embodiments, camera information component 212 may provide the direction and orientation of the camera with respect to unmanned vehicle 102 to remote device 104 and/or server system 108. The camera angle and the camera direction may be used, in part, to determine a given video capture region. Camera information component 212 may also provide the shutter speed, the field of view, the f stop, the film speed, the focal length, aperture, etc.

Unmanned vehicle 102 may include location component 216. In embodiments, location component 216 may be integrated into and/or implemented in connection with instructions 208 and 258. Location component 216 may include one or more locators to locate unmanned vehicle 102. Locators may include GPS receivers, cellular network receivers, Bluetooth®, and/or other locators. Locators may provide location information to remote device 104 and/or server system 108. The location information may or may not be used to determine a location of interest. The location information may or may not be used to generate the representation of the location of interest. The location information may be used to determine a video capture region in the representation.

Referring further to FIG. 2, as mentioned above, unmanned vehicle 102 and unmanned vehicle remote controller 250 may also include processors/circuitry 214 and 260, respectively. Processors/circuitry 214 and 260 may include a processor or processor modules, including, by way of example, an applications processor that interfaces with and/or controls other elements of unmanned vehicle 102 (e.g., connectivity interface 202, transceiver 204, storage 206, instructions 208, camera 210, camera information component 212, and/or location component 216) and unmanned vehicle remote controller 250 (e.g., connectivity interface 252, transceiver 254, storage 256, instructions 258, user interface 262). Processors/circuitry 214 and 260 may include a controller that provides various controls (e.g., interfaces with buttons and switches) related to the operation of unmanned vehicle 102, camera 210, location component 216, user interface 262, and the like, and interfaces with drivers of various audio/visual components of unmanned vehicle 102 and unmanned vehicle remote controller 250, respectively. Additionally, the controller may include various controls related to the camera operation, camera information, location information, such as will be described in further detail herein.

Processors/circuitry 214 and 260 may include processors (including, in some instances, logic circuits), memory, a battery and power circuitry, and other circuitry drivers for periphery components, such as camera 210, location component 216, and/or audio/visual/haptic interfaces that may be included in user interface 262. Processor/circuitry 214 and 260 and any processors thereof may include logic circuits for receiving, processing, and/or storing content or information received and/or generated by, and/or data input to, unmanned vehicle 102, server system 108, and/or unmanned vehicle remote controller 250 and content or information to be transmitted or delivered by unmanned vehicle 102 and/or unmanned vehicle remote controller 250. More particularly, as shown in FIG. 2, processor/circuitry 214 may be coupled by a bus (not shown) to connectivity interface 202 (including transceiver 204) and storage 206 (including instructions 208), as well as to camera 210 and location component 216. Processor/circuitry 260 may also be coupled by a bus (not shown) to connectivity interface 252 (including transceiver 254) and storage 256 (including instructions 258), as well as to a display of user interface 262. Hence, processors/circuitry 214 and 260 may receive and process electrical signals generated by these respective elements and, thus, perform various functions. By way of example, processor/circuitry 214 may access stored content from storage 206 at the direction of instructions 208. Processor/circuitry 260 may access stored content from storage 256 at the direction of instructions 258, and process the stored content for display and/or output by user interface 262. Additionally, processors/circuitry 214 and 260 may process the stored content for transmission via connectivity interfaces 202 and 252 and communication media 106 to each other (unmanned vehicle 102 and unmanned vehicle remote controller 250), as well as remote device 104 and/or server system 108.

In embodiments, logic circuits of processors/circuitry 214 and 260 may further detect, calculate, and/or store data (e.g., video, camera information, location information, etc.) received from camera 210 or another remote source (e.g., from remote device 104 or from server system 108). The logic circuits may use this input to display aspects of a given rendered virtual object provided in a rendered real-time, real-world video on remote device 104.

Processors/circuitry 214 and 260 may be used to drive/control and/or gather information from other peripheral components not shown in detail in FIG. 2. For example, processors/circuitry 214 and 260 may interface with camera lenses and modules of camera 210, including flashes to be operated in connection therewith, the field of view, the f stop, the film speed, the focal length, aperture, etc. that may be used to capture, generate, and/or calculate camera information, as will be described herein, including mechanisms and information relating to capturing real-time, real-world video using camera 210. Processor/circuitry 214 may also interface with video input/output mechanisms such as HDMI, USB, and the like.

Having described some of the various elements of environment 100, unmanned vehicle 102, and unmanned vehicle remote controller 250 shown in FIGS. 1 and 2, an example embodiment using some of these elements for the display of rendered virtual objects in a real-time, real-world rendered video will now be provided. In this non-exhaustive example, unmanned vehicle 102 and server system 108 may be used to generate a rendered real-time, real-world video with rendered virtual objects displayed on remote device 104, as follows. Unmanned vehicle 102 may use camera 210 to capture video. Storage 206 may store instructions 208 that when executed by processor circuitry 214 cause camera 210, camera information component 212, and location component 216 to obtain video, camera information, and location information. The camera information includes the direction the camera is pointed, the angle of the camera with respect to the horizon, and/or other orientation information. The location information includes a real-world position of unmanned vehicle 102.

The video may be sent to server system 108. Unmanned vehicle 102 may also send location information and camera information to server system 108. The server system 108 may generate, on a graphical user interface, a representation of a location of interest based on the location information provided by unmanned vehicle 102. A user may also independently input the location of interest. The representation may include a map of the location of interest and a video capture region. The video capture region may be determined by the portion of the location of interest being captured by unmanned vehicle 102. The video capture region may be depicted in the representation as an outline of a shape, such as a rectangle, circle, triangle, etc. The video capture region may be determined based on the camera information and location information. For example, given the location information of a drone, the video capture region is narrowed to a given radius. Using the camera information to determine angle, orientation, and field of view of the camera, a given video capture region may be determined.

A suite of interactable virtual objects may be displayed on the graphical user interface. The user may place the interactable virtual objects on the map, which may generate data on a real-world position corresponding to where the virtual object was placed in the representation.

The virtual objects and the video may be rendered by a game engine, such that the rendered virtual objects may be overlaid on the rendered real-time, real-world video. The rendered video may be near real-time due to the rendering/processing time. If unmanned vehicle 102 is capturing video within a given location of interest corresponding to the real-world location associated with the virtual object, the video will be rendered and include the rendered virtual object. The rendered video may be displayed to remote device 104. If unmanned vehicle 102 is capturing video within the location of interest and no virtual object has a real-world location corresponding to the region being captured by unmanned vehicle 102, no rendering may need to occur. The real-time, real-world video captured by unmanned vehicle 102 may be displayed to remote device 104. Of course, many variations on this example are possible and within the scope of the present disclosure. This example and aspects thereof may be applied in connection with various embodiments illustrated and/or described in connection with other embodiments described herein.

Figure 3:
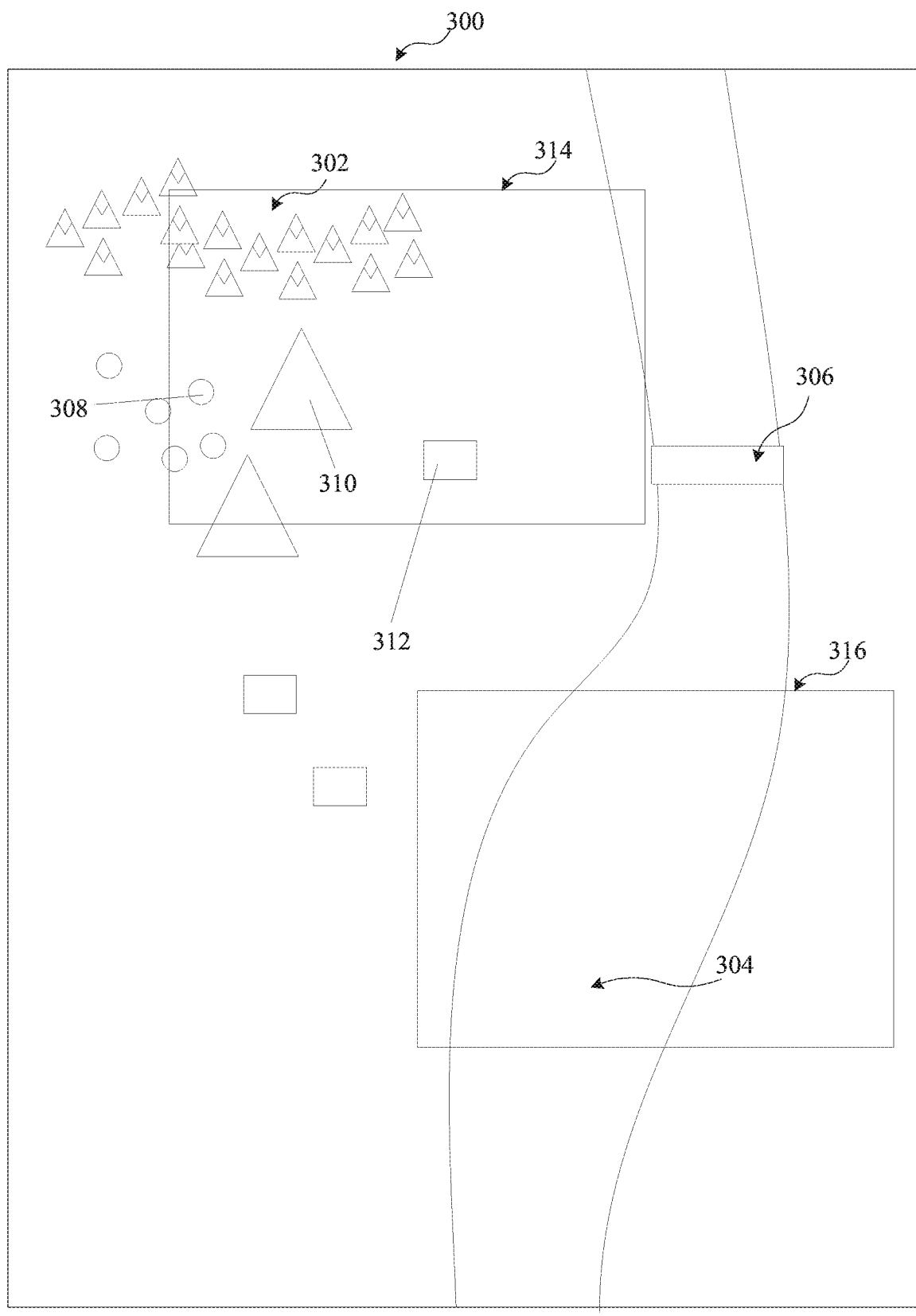
FIG. 3 illustrates an example of a representation of a location of interest with virtual objects in accordance with embodiments of the disclosure.

FIG. 3 illustrates a top view of a representation 300 of a location of interest, according to embodiments of the disclosure. The representation 300 may be a map of the location of interest. The map may be a satellite image of the location of interest. Representation 300 may include real-world objects such as mountains 302 (depicted as triangles with a diamond at the top), river 304 (depicted as two curved lines), and bridge 306 (depicted as a rectangle). Representation 300 may also include virtual objects such as people 308 (depicted as circles), tents 310 (depicted as triangles), and vehicles 312 (depicted as rectangles). Virtual objects 308, 310, and 312 may have been selected by a user via a graphical user interface of server system 108. Virtual objects 308, 310, and 312 can be placed in representation 300 before the unmanned vehicle is capturing video, or while the unmanned vehicle is capturing video. Virtual objects 308, 310, and 312 can be made before the unmanned vehicle is capturing video, or while the unmanned vehicle is capturing video.

Representation 300 may include video capture regions 314 and 316 (depicted as rectangles). Video capture regions 314 and 316 may be a portion of the location of interest unmanned vehicle 102 is capturing via camera 112 (FIG. 2). Video capture region 314 may illustrate a portion of the location of interest being captured by a first unmanned vehicle at a first time. Video capture region 316 may illustrate a portion of the location of interest being captured by a first unmanned vehicle at a second time. Video capture region 314 may illustrate a portion of the location of interest being captured by a second unmanned vehicle at a first time. As one of ordinary skill in the art will recognize, other variations may be used with multiple unmanned vehicle capturing video at different times. Video capture region 314 may include one or more real-world objects 302 and 304 and virtual objects 308, 310, and 312. Video capture region 314 may also include portions of virtual objects 308 and 310 and real-world objects 302 and 304. Video capture region 316 may include a portion of real-world object 304. Real-world object 306 may be within representation 300, but not within video capture regions 314 and 316. Similarly, individual ones of virtual objects 308 and 312 may not be displayed within video capture regions 314 and 316.

Figure 4:
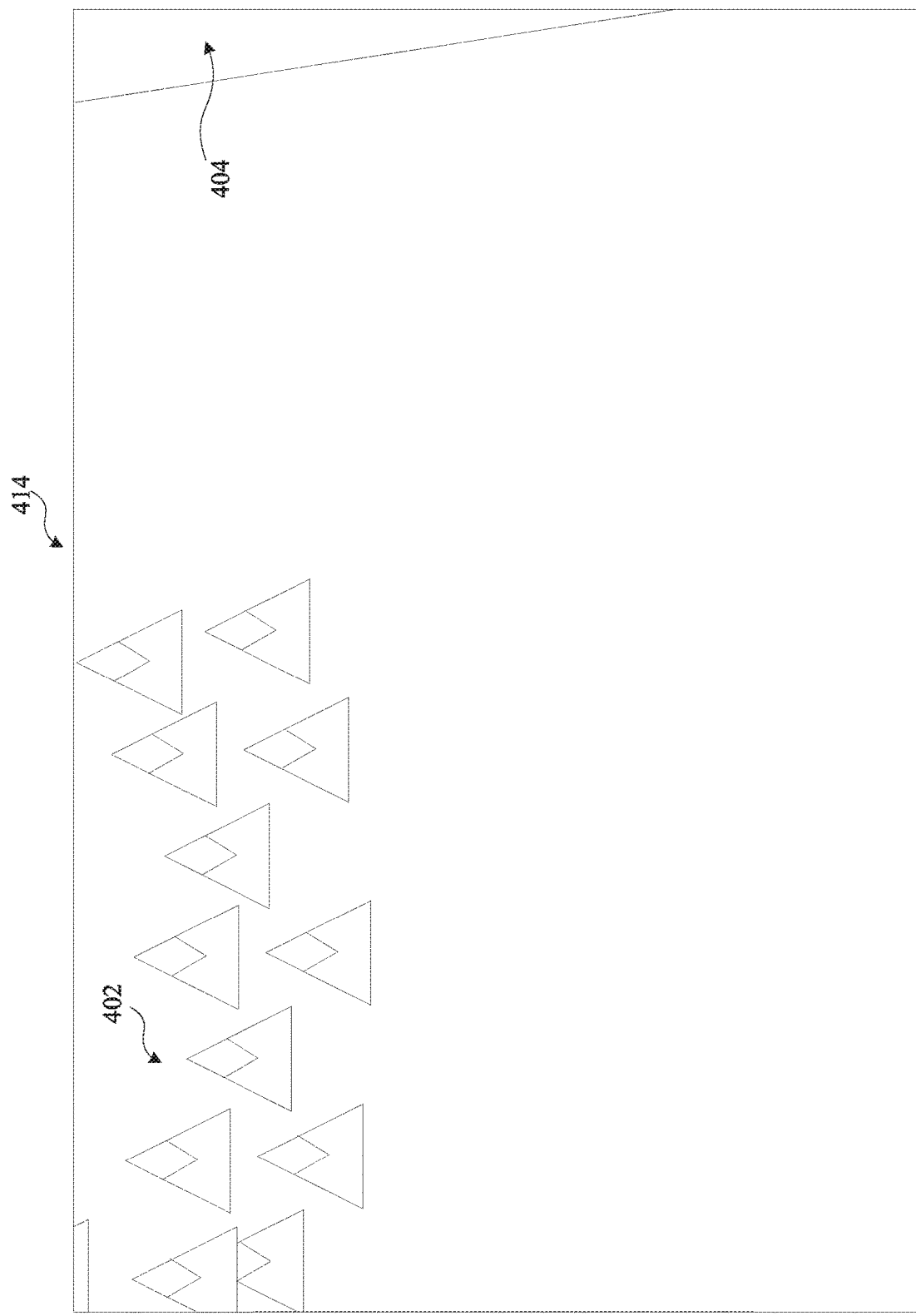
FIG. 4 illustrates an example frame from a video captured by an unmanned vehicle, in accordance with embodiments of the disclosure.

FIG. 4 illustrates a real-time, real-world frame of a video, according to embodiments of the disclosure. As illustrated, frame 414 may be the raw, or unprocessed, frame of a video provided to server system 108 from unmanned vehicle. Frame 414 may correspond to the same region as video capture region 314 (FIG. 3). Unmanned vehicle may be capturing and sending frame 414 of the video to a remote device via server system 108. Frame 414 may include portions of unprocessed real-world objects 402 and 404.

Figure 5:
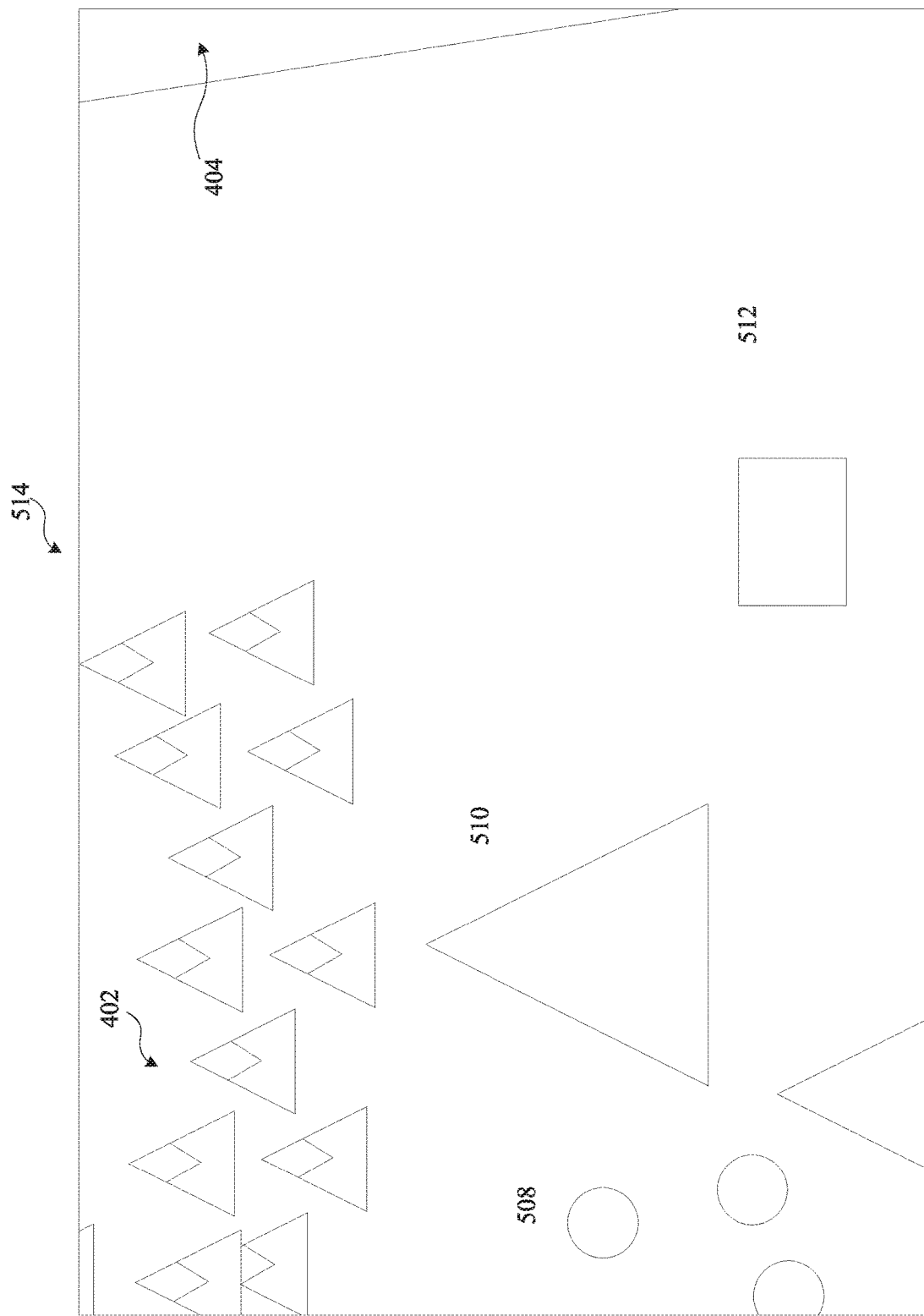
FIG. 5 illustrates an example frame from a rendered video, in accordance with embodiments of the disclosure.

FIG. 5 illustrates a top view of a rendered real-time, real-world frame of a video with virtual objects, according to embodiments of the disclosure. As illustrated, frame 514 may be a real-time real-world rendered frame of the video displayed to a remote device via a graphical user interface. Frame 514 may correspond to the same region as video capture region 314 (FIG. 3). The rendered frame of the video may include rendered virtual objects 508, 510, and 512. Rendered virtual objects 508, 510, and 512 may be derived from virtual objects 308, 310, and 312. Rendered virtual objects 508 may be people (depicted as circles). Rendered virtual objects 510 may be tents (depicted as triangles). Rendered virtual object 512 may be a vehicle (depicted as a rectangle).

Virtual objects 308, 310, and 312 may have been rendered using computer graphics technology, a graphical engine, a game engine, and/or other rendering technology, as described herein. Color, animation, shading, detail, physics, and/or other effects may be added to the rendered virtual objects. For example, the vehicle may be colored green, include wheels and windows, and be programmed to move at a given rate across the location of interest. Rendered virtual objects may be three dimensional. For example, as unmanned vehicle descends and the camera is directed from a downwards direction (top view of rendered virtual objects 508, 510, and 512) to a horizontal direction (side view of rendered virtual objects 508, 510, and 512), rendered virtual objects 508, 510, and 512 may appear to be three dimensional in the rendered video. The circle depicting person 508 may look like a stick figure from a perspective view or may look like a more generic three-dimensional shape from a perspective view, such as a cylinder. The triangle depicting tent 510 may look like a pyramid or a prism from a perspective view. The rectangle depicting vehicle 512 may look like a cuboid from a perspective view.

In one example, a viewer looking at the rendered video on the remote device may direct the pilot of the unmanned vehicle to look inside tent 510. Tent 510 may have been specially created and include beds, books, and/or other details. The viewer may be able to realize a scene or shot using the rendered video derived from the camera of the unmanned vehicle and virtual objects 508, 510, and 512.

Figure 6:
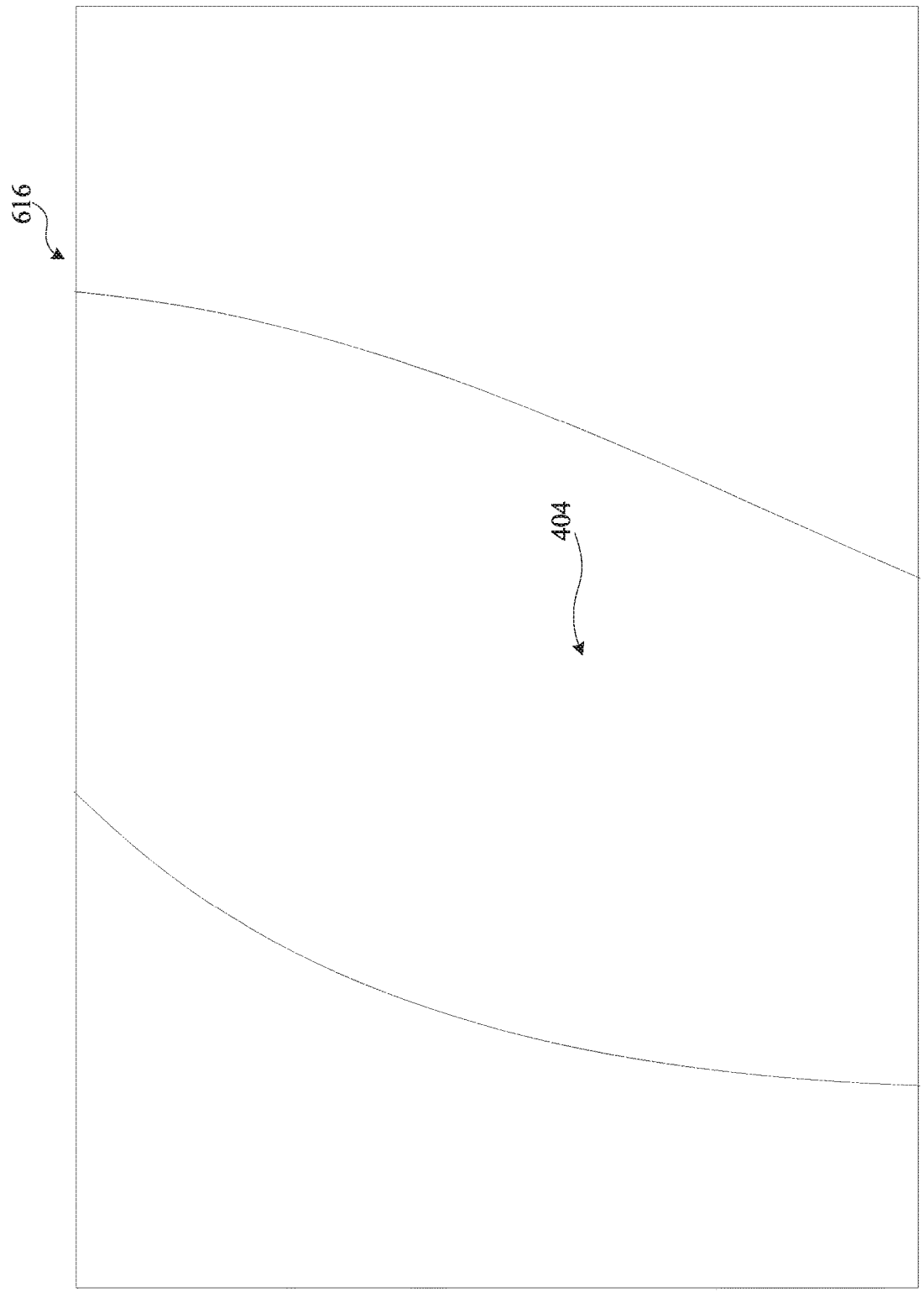
FIG. 6 illustrates an example frame from a video not having virtual objects within a video capture region, in accordance with embodiments of the disclosure.

FIG. 6 illustrates a top view of a real-time, real-world frame of a rendered video, according to embodiments of the disclosure. Frame 616 may not include rendered virtual objects 308, 310, 312. No virtual objects 308, 310, and 312 may need to be rendered in frame 616. The video captured from frame 616 may not need to be rendered. Frame 616 may correspond to the same region as video capture region 316 (FIG. 3). Frame 616 may include portions of the real-world object 404.

Figure 7:
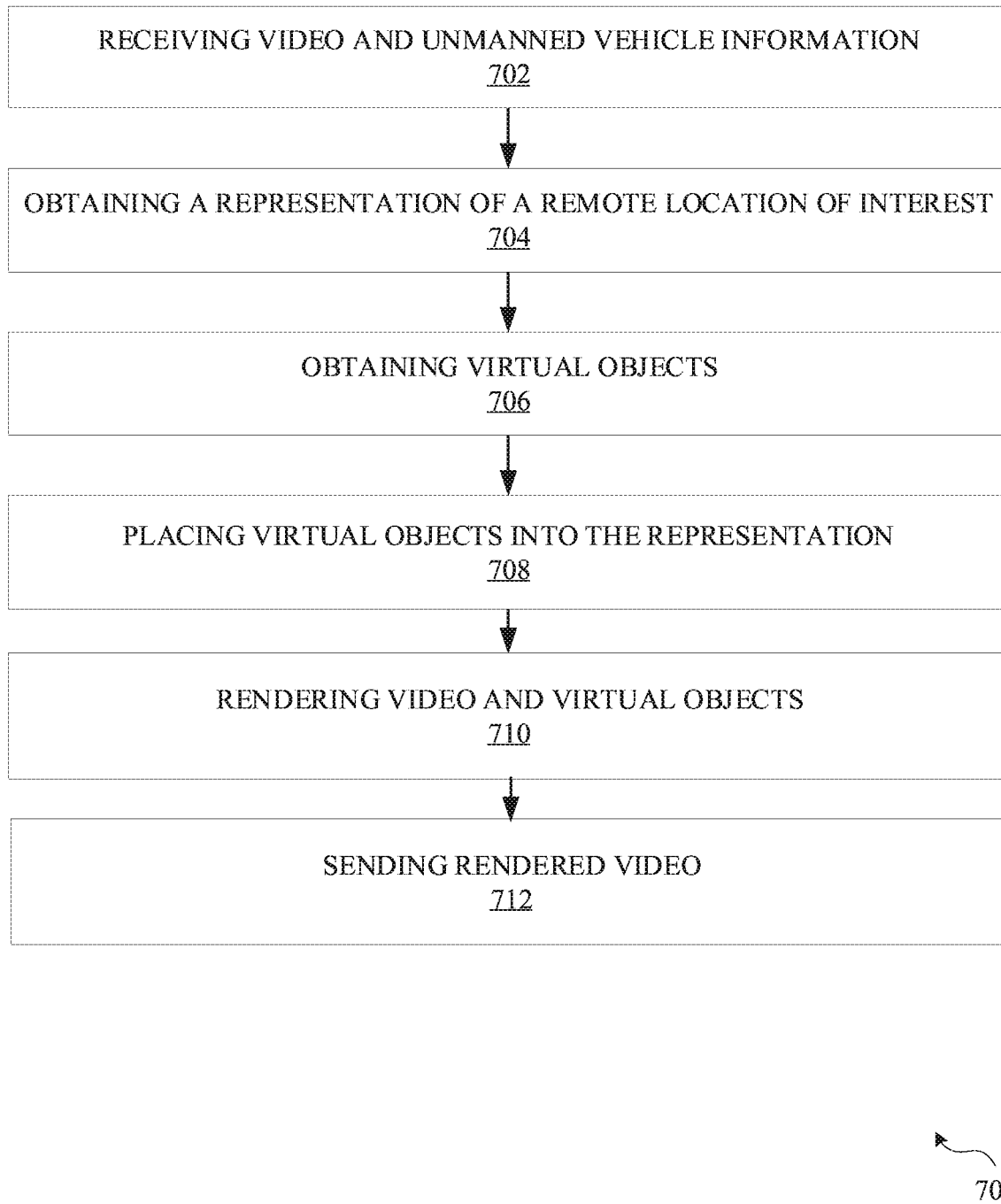
FIG. 7 is an operational flow diagram illustrating various operations that may be performed in accordance with embodiments of the disclosure.

FIG. 7 illustrates a flow diagram depicting various operations of method 700, and accompanying embodiments for providing rendered virtual objects in a real-time, real-world rendered video, in accordance with aspects of the present disclosure. Generally, method 700 composites real-time, real-world video with virtual objects. The operations of the various methods described herein are not necessarily limited to the order described or shown in the figures, and one of skill in the art will appreciate, upon studying the present disclosure, variations of the order of the operations described herein that are within the spirit and scope of the disclosure.

Figure 8:
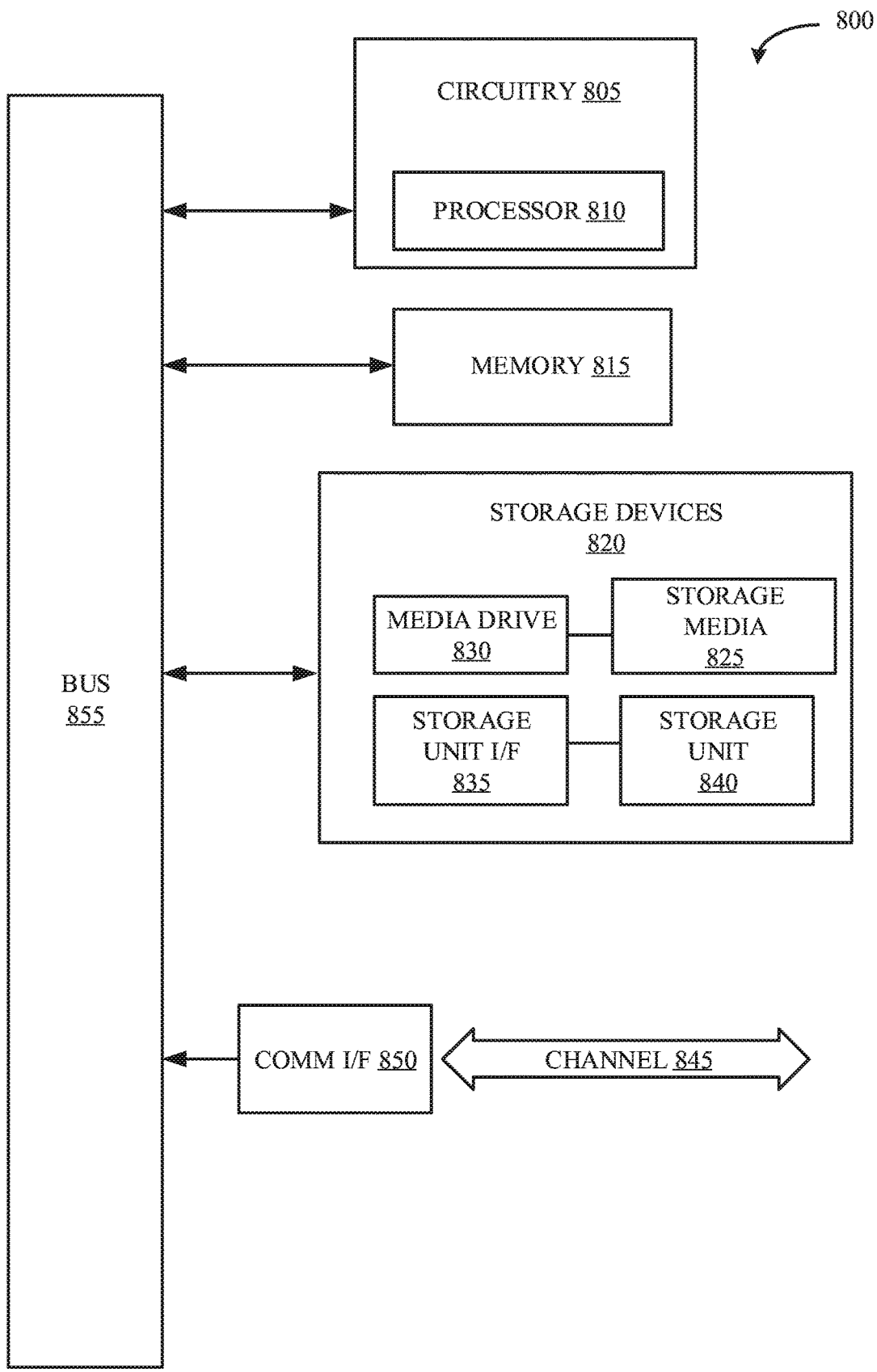
FIG. 8 illustrates an example computing module that may be used to implement features of various embodiments of the disclosure.

The operations and sub-operations of method 700 may be carried out, in some cases, by one or more of the components, elements, devices, modules, and circuitry of environments 100, unmanned vehicle 102, unmanned vehicle remote controller 250, instructions 208 and 258, camera 210, location component 216, processors/circuitry 214 and 260, connectivity interfaces 202 and 252, remote device 104, server system 108, and/or computing module 800, etc. described herein and referenced with respect to at least FIGS. 1, 2, and 8, as well as sub-components, elements, devices, modules, and circuitry depicted therein and/or described with respect thereto. In such instances, the description of methods 700 may refer to a corresponding component, element, etc., but regardless of whether an explicit reference is made, one of skill in the art will recognize, upon studying the present disclosure, when the corresponding component, element, etc. may be used. Further, it will be appreciated that such references do not necessarily limit the described methods to the particular component, element, etc. referred to. Thus, it will be appreciated by one of skill in the art that aspects and features described above in connection with (sub-) components, elements, devices, modules, and circuitry, etc., including variations thereof, may be applied to the various operations described in connection with methods 700 without departing from the scope of the present disclosure.

Referring now to FIG. 7, aspects of method 700 for providing rendered virtual objects in a real-time, real-world rendered video are depicted. At operation 702, method 700 includes receiving unmanned vehicle information. In embodiments, unmanned vehicle information may include video, camera information, and location information. Camera 212 of unmanned vehicle 102 (referencing FIG. 2 by way of example) is used to capture the video. The video can be uploaded to server system 108 and stored in storage 112 for later download to remote device 104 via communication media 106. The video may be a series of frames (e.g., camera 210 may be a video camera that captures a series of frames).

In embodiments, the video that may be captured at operation 702 includes one or more real-world objects. Real-world objects, may include mountains, volcanos, boulders, rivers, lakes, oceans, trees, animals, etc.

In embodiments, the angle and orientation of the camera may be determined. The angle of the camera may be determined with respect to a horizon. The orientation of the camera may be determined with respect to the unmanned vehicle. Other camera information such as shutter speed, field of view, f stop, etc. may be determined. In embodiments, the location information may be based on locators on the unmanned vehicle. The locators may be GPS receivers and/or other locators. The locators may be used to determine the location of interest.

At operation 704, method 700 includes obtaining a representation of a location of interest. The representation may be a map of the location of interest, or otherwise correspond to the location of interest. The representation may include real-world objects. The map may be a satellite map, topographic map, physical map, and/or other maps. The map may be digital, virtual, or otherwise provided on a graphical user interface of the system. A user may be able to interact with the map via the graphical user interface.

The location of interest may be based on the location information gathered by the unmanned vehicle. The location of interest may be otherwise determined based on previous knowledge of the general region of the location of interest.

At operation 706, method 700 includes obtaining virtual objects. A suite of virtual objects may be provided on the graphical user interface. Virtual objects may be generic (e.g., squares, cylinders, cubes, rectangles, etc.) or specific (an illustrated person, a dragon, a car, a house, etc.). The virtual objects may be pre-designed and/or designed while the unmanned vehicle is capturing video.

At operation 708, method 700 includes placing the virtual objects into the representation. Individual virtual objects may be selected and placed into the representation, which may generate data on the location of where the virtual object was placed, corresponding to a real-world position in the location of interest. Placing the virtual objects may include dragging and dropping the virtual objects from the suite of virtual objects into the representation. One of skill in the art will recognize, upon studying the present disclosure, that virtual objects may be duplicated, deleted, or otherwise manipulated.

At operation 710, method 700 includes rendering the virtual objects and the video based on the unmanned vehicle information and the location of the virtual objects in the representation. The virtual objects and the video may be rendered by a graphics engine, such as a game engine, to overlay the rendered virtual objects onto the video. The rendered virtual objects may appear three-dimensional in a rendered video. Rendering may include determining whether a given frame of a rendered video includes rendered virtual objects. Using the location information of the drone as well as camera information, etc., as described above, a particular region may be determined as being currently captured. Using the virtual object data from the representation, a given virtual object may correspond to a given real-world position. Based on the location information and camera information of the unmanned vehicle, when the camera of the unmanned vehicle is capturing a frame of the given real-world position of a virtual object, the graphics engine may overlay, composite, integrate, or otherwise include the rendered virtual object into the rendered video. In embodiments, based on the location information and camera information of the unmanned vehicle, the camera may be capturing a frame of a given real-world location where no virtual object has a corresponding real-world location. The video may not need to be rendered.

At operation 712, method 700 includes sending the rendered video including the rendered virtual objects. The rendered video may be received and displayed to a remote device, such as a television, tablet, smartphone, wearable device, unmanned vehicle remote controller, and/or other devices. As mentioned above, the video may not be rendered when no virtual objects are located within the video capture region.

FIG. 8 illustrates example computing module 800, which may in some instances include a processor/controller resident on a computer system (e.g., server system 108, unmanned vehicle 102, and/or remote device 108). Computing module 800 may be used to implement various features and/or functionality of embodiments of the systems, devices, and methods disclosed herein. With regard to the above-described embodiments set forth herein in the context of systems, devices, and methods described with reference to FIGS. 1 through 7, including embodiments involving unmanned vehicle 102, remote device 104, and/or server system 108, one of skill in the art will appreciate additional variations and details regarding the functionality of these embodiments that may be carried out by computing module 800. In this connection, it will also be appreciated by one of skill in the art upon studying the present disclosure that features and aspects of the various embodiments (e.g., systems) described herein may be implemented with respected to other embodiments (e.g., methods) described herein without departing from the spirit of the disclosure.

As used herein, the term module may describe a given unit of functionality that may be performed in accordance with one or more embodiments of the present application. As used herein, a module may be implemented utilizing any form of hardware, software, or a combination thereof. For example, one or more processors, controllers, ASICs, PLAs, PALs, CPLDs, FPGAs, logical components, software routines or other mechanisms may be implemented to make up a module. In implementation, the various modules described herein may be implemented as discrete modules or the functions and features described may be shared in part or in total among one or more modules. In other words, as would be apparent to one of ordinary skill in the art after reading this description, the various features and functionality described herein may be implemented in any given application and may be implemented in one or more separate or shared modules in various combinations and permutations. Even though various features or elements of functionality may be individually described or claimed as separate modules, one of ordinary skill in the art will understand upon studying the present disclosure that these features and functionality may be shared among one or more common software and hardware elements, and such description shall not require or imply that separate hardware or software components are used to implement such features or functionality.

Where components or modules of the application are implemented in whole or in part using software, in embodiments, these software elements may be implemented to operate with a computing or processing module capable of carrying out the functionality described with respect thereto. One such example computing module is shown in FIG. 8. Various embodiments are described in terms of example computing module 800. After reading this description, it will become apparent to a person skilled in the relevant art how to implement example configurations described herein using other computing modules or architectures.

Referring now to FIG. 8, computing module 800 may represent, for example, computing or processing capabilities found within mainframes, supercomputers, workstations or servers; desktop, laptop, notebook, or tablet computers; hand-held computing devices (tablets, PDA's, smartphones, cell phones, palmtops, etc.); or the like, depending on the application and/or environment for which computing module 800 is specifically purposed.

Computing module 800 may include, for example, one or more processors, controllers, control modules, or other processing devices, such as a processor 810, and such as may be included in circuitry 805. Processor 810 may be implemented using a special-purpose processing engine such as, for example, a microprocessor, controller, or other control logic. In the illustrated example, processor 810 is connected to bus 855 by way of circuitry 805, although any communication medium may be used to facilitate interaction with other components of computing module 800 or to communicate externally.

Computing module 800 may also include one or more memory modules, simply referred to herein as main memory 815. For example, random access memory (RAM) or other dynamic memory may be used for storing information and instructions to be executed by processor 810 or circuitry 805. Main memory 815 may also be used for storing temporary variables or other intermediate information during execution of instructions to be executed by processor 810 or circuitry 805. Computing module 800 may likewise include a read only memory (ROM) or other static storage device coupled to bus 855 for storing static information and instructions for processor 810 or circuitry 805.

Computing module 800 may also include one or more various forms of information storage devices 820, which may include, for example, media drive 630 and storage unit interface 835. Media drive 830 may include a drive or other mechanism to support fixed or removable storage media 825. For example, a hard disk drive, a floppy disk drive, a magnetic tape drive, an optical disk drive, a CD or DVD drive (R or RW), or other removable or fixed media drive may be provided. Accordingly, removable storage media 825 may include, for example, a hard disk, a floppy disk, magnetic tape, cartridge, optical disk, a CD or DVD, or other fixed or removable medium that is read by, written to or accessed by media drive 830. As these examples illustrate, removable storage media 825 may include a computer usable storage medium having stored therein computer software or data.

In alternative embodiments, information storage devices 820 may include other similar instrumentalities for allowing computer programs or other instructions or data to be loaded into computing module 800. Such instrumentalities may include, for example, fixed or removable storage unit 840 and storage unit interface 835. Examples of such removable storage units 840 and storage unit interfaces 835 may include a program cartridge and cartridge interface, a removable memory (for example, a flash memory or other removable memory module) and memory slot, a PCMCIA slot and card, and other fixed or removable storage units 840 and storage unit interfaces 835 that allow software and data to be transferred from removable storage unit 840 to computing module 800.

Computing module 800 may also include a communications interface 850. Communications interface 850 may be used to allow software and data to be transferred between computing module 800 and external devices. Examples of communications interface 850 include a modem or softmodem, a network interface (such as an Ethernet, network interface card, WiMedia, IEEE 802. XX, or other interface), a communications port (such as for example, a USB port, IR port, RS232 port Bluetooth® interface, or other port), or other communications interface. Software and data transferred via communications interface 850 may typically be carried on signals, which may be electronic, electromagnetic (which includes optical) or other signals capable of being exchanged by a given communications interface 850. These signals may be provided to/from communications interface 850 via channel 845. Channel 845 may carry signals and may be implemented using a wired or wireless communication medium. Some non-limiting examples of channel 845 include a phone line, a cellular or other radio link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 815, storage unit interface 835, removable storage media 825, and channel 845. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions may enable the computing module 800 or a processor to perform features or functions of the present application as discussed herein.

Various embodiments have been described with reference to specific example features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various example embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the present application, whether or not such embodiments are described and whether or not such features are presented as being a part of a described embodiment. Thus, the breadth and scope of the present application should not be limited by any of the above-described example embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide illustrative instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "process," "processed," "processing," and the like may be used synonymously with "render," "rendered," "rendering," and the like. The use of the term "module" does not imply that the components or functionality described or claimed as part of the module are all configured in a common package. Indeed, any or all of the various components of a module, whether control logic or other components, may be combined in a single package or separately maintained and may further be distributed in multiple groupings or packages or across multiple locations.

Additionally, the various embodiments set forth herein are described in terms of example block diagrams, flow charts, and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

What is claimed is:
1. A system for compositing real-world video with a virtual object comprising:

a processor; and a computer-readable non-transitory storage medium, the computer-readable non-transitory storage medium encoded with instructions that when executed cause the processor to perform operations comprising:

receiving video of a video capture region from a camera coupled to an unmanned vehicle and an orientation of the camera during capture of the video;

obtaining a map representation of the video capture region;

placing the virtual object into the map representation;

rendering the video with the virtual object to generate a rendered video;

displaying the rendered video;

receiving an updated orientation of the camera; and based on a change to an elevation of the unmanned vehicle and the updated orientation of the camera, updating the virtual object in the rendered video to transition between a first representation of the virtual object at a first elevation of the unmanned vehicle and a second representation of the virtual object at a second elevation of the unmanned vehicle, wherein the virtual object appears to be two dimensional in the first representation and three dimensional in the second representation.

2. The system of claim 1, wherein the virtual object is placed into the map representation at a virtual location that corresponds to a real-world location.

3. The system of claim 2, wherein the non-transitory computer-readable medium stores instructions that, when executed, cause the processor to generate object data for the virtual object based on the real-world location.

4. The system of claim 3, wherein the object data includes an indication that the real-world location is viewable in the video, wherein the non-transitory computer-readable medium stores instructions that, when executed, cause the processor to render the virtual object in the rendered video responsive to the indication that the real-world location is viewable in the video.

5. The system of claim 1, wherein the non-transitory computer-readable medium stores instructions that, when executed, cause the processor to receive location information based on a location of the unmanned vehicle, wherein the location information includes the elevation of the unmanned vehicle.

6. The system of claim 5, wherein the map representation is based on the location information.

7. The system of claim 1, wherein the non-transitory computer-readable medium stores instructions that, when executed, cause the processor to further receive an angle of the camera, wherein the orientation of the camera is determined with respect to the unmanned vehicle, wherein the angle is measured with respect to a horizon.

8. The system of claim 7, wherein:

the virtual object is placed into the map representation at a virtual location that corresponds to a real-world location, and the non-transitory computer-readable medium stores instructions that, when executed, cause the processor to:

receive location information based on a location of the unmanned vehicle, generate object data for the virtual object based on the real-world location, and determine whether the real-world location is within the video capture region based on at least one of the location information, the orientation of the camera, the angle of the camera, or the object data.

9. The system of claim 1, wherein the first representation of the virtual object comprises a first pre-designed asset and the second representation of the virtual object comprises a second pre-designed asset.

10. The system of claim 1, wherein the rendered video is displayed on a graphical user interface.

11. The system of claim 1, further comprising a head-mounted display, wherein the rendered video is displayed on the head-mounted display.

12. The system of claim 1, wherein updating the virtual object in the rendered video comprises transitioning between the first representation of the virtual object and the second representation of the virtual object where the orientation of the camera is a downwards orientation and the updated orientation of the camera is a horizontal or angled orientation.

13. A method for compositing real-time, real-world video with a virtual object, comprising:

receiving video of a video capture region from a camera coupled to an unmanned vehicle and an orientation of the camera during capture of the video;

obtaining a map representation of the video capture region;

placing the virtual object into the map representation;

rendering the video with the virtual object to generate a rendered video;

displaying the rendered video;

receiving an updated orientation of the camera; and based on a change to an elevation of the unmanned vehicle and the updated orientation of the camera, updating the virtual object in the rendered video to transition between a first representation of the virtual object at a first elevation of the unmanned vehicle and a second representation of the virtual object at a second elevation of the unmanned vehicle, wherein the virtual object appears to be two dimensional in the first representation and three dimensional in the second representation.

14. The method of claim 13, wherein the virtual object is placed into the map representation at a virtual location that corresponds to a real-world location.

15. The method of claim 14, further comprising generating object data based on the real-world location.

16. The method of claim 15, wherein the object data includes an indication that the real-world location is viewable in the video, wherein the method further comprises rendering the virtual object in the rendered video responsive to the indication that the real-world location is viewable in the video.

17. The method of claim 13, further comprising:

receiving location information based on a location of the unmanned vehicle, wherein the location information includes the elevation of the unmanned vehicle; and receiving an angle of the camera, wherein the angle is measured with respect to a horizon, wherein the orientation of the camera is determined with respect to the unmanned vehicle.

18. The method of claim 17, wherein the virtual object is placed into the map representation at a virtual location that corresponds to a real-world location, and the method further comprises:

generating object data based on the real-world location; and determining whether the real-world location is within the video capture region based on at least one of the location information, the orientation of the camera, the angle of the camera, or the object data.

19. The method of claim 13, wherein rendering the video with the virtual object to generate the rendered video comprising overlaying the virtual object onto the video or compositing the virtual object with the video.

20. A system for compositing real-world video with a virtual object comprising:
an unmanned vehicle;
a processor configured to:
receive video of a video capture region from a camera coupled to the unmanned vehicle and an orientation of the camera during capture of the video;
obtain a map representation of the video capture region;
place the virtual object into the map representation;
render the video with the virtual object to generate a rendered video;
display the rendered video;
receive an updated orientation of the camera; and
based on a change to an elevation of the unmanned vehicle and the updated orientation of the camera, update the virtual object to transition between a first representation of the virtual object at a first elevation of the unmanned vehicle and a second representation of the virtual object at a second elevation of the unmanned vehicle, wherein the virtual object appears to be two dimensional in the first representation and three dimensional in the second representation.

* * * * *